US012280608B2

(12) United States Patent
Rodriguez et al.

(10) Patent No.: US 12,280,608 B2
(45) Date of Patent: Apr. 22, 2025

(54) REMOVABLE SUPPORTING DEVICE TO SUPPORT AN ENDLESS RIBBON

(71) Applicant: ARMOR, Nantes (FR)

(72) Inventors: Juan Rodriguez, As (BE); Maxime Charrier, Trementines (FR); Frans Hegge, Hamont-Achel (BE)

(73) Assignee: ARMOR, Nantes (FR)

( * ) Notice: Subject to any disclaimer, the term of this patent is extended or adjusted under 35 U.S.C. 154(b) by 12 days.

(21) Appl. No.: 18/355,052

(22) Filed: Jul. 19, 2023

(65) Prior Publication Data

US 2024/0034083 A1 Feb. 1, 2024

(30) Foreign Application Priority Data

Jul. 28, 2022 (EP) .................................... 22315174

(51) Int. Cl.

| | |
|---|---|
| ***B41J 31/16*** | (2006.01) |
| ***B41J 33/10*** | (2006.01) |
| ***B41J 35/04*** | (2006.01) |
| ***B41J 35/28*** | (2006.01) |

(52) U.S. Cl.

CPC ............... *B41J 31/16* (2013.01); *B41J 33/10* (2013.01); *B41J 35/04* (2013.01); *B41J 35/28* (2013.01)

(58) Field of Classification Search

CPC ... B41J 31/16; B41J 32/02; B41J 33/10; B41J 35/04; B41J 35/08; B41J 35/28

See application file for complete search history.

(56) References Cited

U.S. PATENT DOCUMENTS

| | | | | |
|---|---|---|---|---|
| 4,264,224 | A * | 4/1981 | Mathews | B41J 33/22 400/208 |
| 4,517,573 | A * | 5/1985 | Yana | B41J 2/325 347/217 |
| 4,707,155 | A | 11/1987 | Burkhead et al. | |
| 8,801,306 | B2 * | 8/2014 | Lakin | B41J 35/08 400/234 |
| 2020/0047488 | A1 | 2/2020 | Yamane et al. | |

FOREIGN PATENT DOCUMENTS

| | | | |
|---|---|---|---|
| EP | 0 412 179 | A1 | 2/1991 |
| JP | H04-235080 | A | 8/1992 |
| WO | WO 2022/128941 | A1 | 6/2022 |
| WO | WO 2022/128946 | A1 | 6/2022 |
| WO | WO 2022/128958 | A1 | 6/2022 |

OTHER PUBLICATIONS

Extended European Search Report as issued in European Patent Application No. 22315174.7, dated Dec. 20, 2022.

* cited by examiner

*Primary Examiner* — Jill E Culler

(74) *Attorney, Agent, or Firm* — Pillsbury Winthrop Shaw Pittman LLP

(57) ABSTRACT

A removable supporting device includes a frame; an endless ribbon; and a supporting system to support the endless ribbon, the supporting system including at least two rollers connected to the frame; the at least two rollers including a first connecting system adapted to cooperate with a first complementary connecting system of a thermal transfer printing apparatus.

18 Claims, 5 Drawing Sheets

REMOVABLE SUPPORTING DEVICE TO SUPPORT AN ENDLESS RIBBON

CROSS-REFERENCE TO RELATED APPLICATIONS

This application claims priority to European Patent Application No. 22315174.7, filed Jul. 28, 2022, the entire content of which is incorporated herein by reference in its entirety.

FIELD

The invention relates to the technical field of supporting devices, and more particularly to a removable supporting device to support an endless ribbon adapted to cooperate with a thermal transfer printing apparatus.

BACKGROUND

A thermal transfer printer is a machine that creates an image by melting ink from an ink donner film (ribbon) and transferring it at selective locations onto a receiving material (substrate). Such printer usually comprises a print head and rollers to hold and unwind an inked ribbon. In fact, in those type of printers, the ribbon is mounted onto a core to be unwound during printing. The ink donor film therefore presents a limited length, comprises two ends and shall be disposed after use. Handling such ribbon is eased thanks to the presence of the core.

The present invention deals with an alternative class of thermal transfer printer to cope with the disposal of such used ribbon. Such printer requires the use of an endless ribbon or endless band, whereby a coating composition (i.e., ink) is applied as a plain layer intended to be selectively transferred by thermal transfer printing onto a substrate, according to a predefined pattern, image or set of data.

Such printing apparatus is described in EP0412179, U.S. Pat. No. 4,707,155, JP4235080, WO/2022/128946, WO/2022/128946, WO/2022/128958 and, WO/2022/128941 the entire disclosure of which are hereby incorporated by reference into this specification.

For this alternative class of printer, no core is required to hold the endless ribbon since the endless ribbon is supported by a conveyor system (or support rollers) implemented within the printer.

The endless ribbon is designed to be flexible and to withstand a large number of cycles, for example a million of cycles, through the system. During printing, the endless ribbon is subjected to mechanical stretch in tension as well as thermal cycles to successively melt and cool the ink coated on its outer surface. To ensure the durability of the endless ribbon in the long run, specific polymers are used such as polyimide or the like. Although such materials and endless ribbon made of such materials may exhibit high mechanical strength and thermal stability, thermo-mechanical fatigue is induced in the long run. In addition, the flexural strength or flexibility of the endless ribbon may decrease over time. For those reasons, the endless ribbon must be replaced at some point.

However, a manual replacement of a ribbon in a conveyor system implies several limitations. Firstly, a manual insertion of the ribbon is impossible without taking a lot of precautions not to damage it. Indeed, a conveyor system may comprise a lot of rollers and the ribbons used in such conveyors systems are usually thin and unstable. It is then not possible to guaranty a good repeatability in replacing the ribbon without taking the risk of damaging it. Secondly, such replacement takes a long time. Indeed, the path of the ribbon is more complex. This solution disadvantageously implies to stop the production line for a long time to replace the ribbon.

The document US20200047488 discloses a mounting arrangement for an endless belt. In this document, a method is described wherein a profiling unit is used to facilitate an operation of mounting the endless belt into an apparatus main body. The profiling unit comprises a plurality of supports to carry the endless belt. However, a mounting arrangement such as the one described in US20200047488 would not be consistent to be used to cooperate with an alternative class of thermal printing apparatus and would not allow to change an endless ribbon without limiting the time of interruption of the printing process.

SUMMARY

An aspect of the present invention limits at least one of the precited disadvantages.

According to a first aspect, the invention relates to a removable supporting device comprising:

A frame;

An endless ribbon;

A supporting system to support the endless ribbon, the supporting system comprising at least two rollers connected to the frame; the at least two rollers comprising a first connecting system adapted to cooperate with a first complementary connecting system of a thermal transfer printing apparatus.

A benefit is to allow changing efficiently an endless ribbon worn by a large number of cycles in the thermal transfer printing apparatus.

Another benefit is to replace the endless ribbon in such a way that it is well positioned for printing.

Another benefit is to limit the time of interruption or idle time of the printing process.

In an embodiment, the supporting system comprises a tensing system connected to the frame to keep the endless ribbon under tension.

A benefit is to keep the endless ribbon in a configuration wherein it is ready for printing when the removable supporting device is inserted in the thermal transfer printing apparatus.

In an embodiment, the tensing system comprises a first moving roller movable along a predefined trajectory in a plane sensibly perpendicular to the longitudinal axis of said moving roller.

A benefit is to allow adjusting the tension in the endless ribbon and to ensure printing quality.

In an embodiment, the tensing system comprises a buffer comprising the first moving roller and a second moving roller, the second moving roller being movable along a predefined trajectory in a plane sensibly perpendicular to the longitudinal axis of said second moving roller.

A benefit is to allow creating a local variation in the speed of the endless ribbon when the removable device is inserted in the thermal transfer printing apparatus.

In an embodiment, both the first moving roller and the second moving roller of the buffer are movable along a circular trajectory around a same second axis of rotation sensibly parallel to a first axis of rotation of the rollers. By sensibly parallel, it is meant that there could be a non-zero degree angle, such as less than +/−5 degrees, between the first and second axes.

In an embodiment, both the first moving roller and the second moving roller of the buffer are mounted onto a support, the support being movable in rotation around a third axis of rotation sensibly parallel to the second axis of rotation. By sensibly parallel, it is meant that there could be a non-zero degree angle, such as less than +/−5 degrees, between the second and third axes.

A benefit is to control the tension of the endless ribbon within the buffer zone with one unique motor controlling the rotation of the of the support.

In an embodiment, the buffer comprises a spring element allowing rotation of the support along the third axis of rotation.

In an embodiment, the tensing system comprises a supporting system or support having an outer convex portion to support the endless ribbon, the supporting system comprising two longitudinal elements connected to the frame with a link allowing at least one degree of freedom in rotation around a fourth axis of rotation parallel to a longitudinal axis of the rollers.

In an embodiment, the supporting system is movable between a first position and a second position, the first position allowing to maintain the endless ribbon on the outer convex portion with a local first predefined tension and the second position allowing reducing the local tension in the endless ribbon.

A benefit is to allow placing the endless ribbon on a roller of the thermal transfer printing apparatus when the removable supporting device is engaged with the thermal transfer printing apparatus.

In an embodiment, the removable supporting device comprises a delamination roller having a lower diameter than the rollers, the delamination roller comprising a longitudinal bearing extending from the frame and parallelly to the delamination roller, the longitudinal bearing mechanically strengthening the delamination roller.

A benefit is to allow a separation between the substrate and the endless ribbon after the printhead when the removable device is engaged with the thermal transfer printing apparatus.

In an embodiment, the frame comprises a second connecting system adapted to cooperate with a distal end of a roller of the thermal transfer printing apparatus.

A benefit is to allow separating a roller from the thermal transfer printing apparatus.

In an embodiment, at least one roller comprises an arm having a first distal end connected to the roller and a second distal end mechanically connected to the frame by a pivot connection allowing the rotation of the roller along a predefined trajectory around the first longitudinal axis and, in an embodiment, translation along a predefined trajectory.

A benefit is to allow placing the endless ribbon on a roller of the thermal transfer printing apparatus when the removable supporting device is engaged with the thermal transfer printing apparatus In an embodiment, the first connecting system comprises an element of a male/female connecting system and the first complementary connecting system of the thermal transfer printing apparatus comprise a complementary element of the male/female connecting system.

A benefit is to reinforce the mechanical and/or electronical connection between the first connecting system of the removable supporting device and the complementary first connecting system of the thermal transfer printing apparatus.

According to another aspect, the invention relates to a thermal transfer printing apparatus comprising:

- A coating module to coat the endless ribbon with a coating composition;
- A printhead to print by thermal transfer a portion of the coating composition on a printing zone;
- A removable supporting device according to the first aspect of the invention wherein the supporting system is adapted to transport the endless ribbon from the coating module to the printhead and from the printhead to the coating module;
- The first complementary connecting system adapted to cooperate with the first connecting system of the supporting system,
- A motor to drive at least one roller of the thermal transfer printing apparatus.

In an embodiment, the delamination roller of the removable supporting device comprises an electrically conductive material and is arranged in such a way that at least a portion of the delamination roller is in contact with the endless ribbon at a position located between the printhead and the coating module. The delamination roller is for example arranged in such a way that at least a portion of said delamination roller is in contact with the endless ribbon at a position located after the printhead according to a ribbon path. Such position may allow electrostatic discharge of the endless ribbon after its passage through the printhead.

According to another aspect, the invention relates to a method to replace an endless ribbon in a thermal transfer printing apparatus using a removable supporting device according to the first aspect of the invention, the method comprising:

- Inserting the removable supporting device in the thermal transfer printing apparatus in such a way that the first connecting system cooperates with the first complementary connecting system;

In an embodiment, the method comprises:

- Removing a second removable supporting device from the thermal printing apparatus.

In an embodiment, the method comprises:

- Controlling alignment of the first connecting system and of the first complementary connecting system with a controller;
- Controlling a position of the endless ribbon in the thermal transfer printing apparatus with at least one position sensor;
- Driving at least one roller of the thermal transfer printing apparatus and/or of the removable supporting device if the position detected does not correspond to a target position.

According to an aspect, the invention relates to a removable supporting device comprising:

- A frame;
- An endless ribbon;
- A supporting system to support the endless ribbon, the supporting system comprising:
  - at least two rollers connected to the frame; the at least two rollers comprising a first connecting system adapted to cooperate with a first complementary connecting system of a thermal transfer printing apparatus,
  - a delamination roller having a lower diameter than the rollers.

In an embodiment, the delamination roller comprises a longitudinal bearing extending from the frame and parallelly to the delamination roller, the longitudinal bearing mechanically strengthening the delamination roller.

In an embodiment, the longitudinal bearing comprises a first cooperation block cooperating with a first end of the delamination roller proximate to the frame and a second cooperation block cooperating with a second end of the delamination roller opposite to the first end of the delamination roller.

In an embodiment, the delamination roller comprises an electrically conductive material and the delamination roller comprises a portion in contact with the endless ribbon to allow electrostatic discharge of the endless ribbon.

BRIEF DESCRIPTION OF FIGURES

Other features and benefits that characterize embodiments of the present invention will be apparent upon reading the following detailed description and reviewing the associated figures which illustrate.

DETAILED DESCRIPTION

Figure 1:
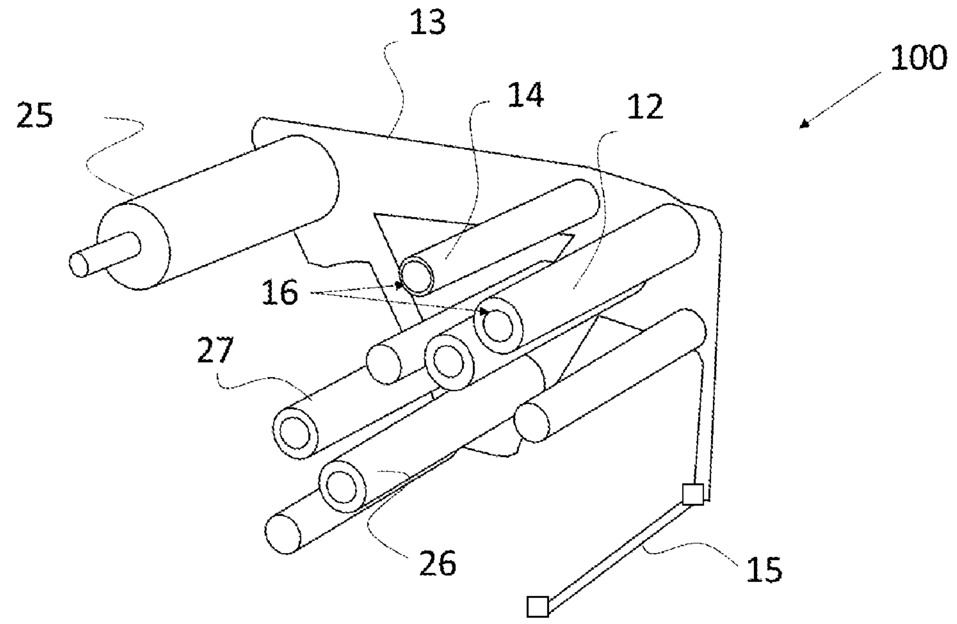
FIG. 1: a schematic representation of a removable supporting device according to a first embodiment of the invention, wherein the removable supporting device comprises a plurality of rollers connected to a frame.

FIG. 1 shows a first example of a removable supporting device 100 according to one embodiment of the present invention. The removable supporting device 100 is adapted to cooperate with a thermal transfer printing apparatus 200. Cooperation between the removable supporting device and the thermal transfer printing apparatus may encompass different actions such as but not limited to communication, coordination, assistance, transfer of data, memory effect, or power supply.

Removable Supporting Device: Frame

The removable supporting device 100 comprises a frame 13. The frame 13 may comprise a plastic material. The frame 13 may also comprise a molded part, a composite part or a material comprising aluminum. In this configuration, the weight of the removable supporting device 100 is beneficially reduced.

In an embodiment, the shape of the frame 13 is flat. The frame 13 may also be bended or may comprise a convex portion.

In an embodiment, the frame 13 comprises at least one sensor. The sensor may comprise, but not limited to, a position sensor. The position sensor beneficially allows to detect a displacement of the removable supporting device 10, for instance to prevent its damage. The position sensor also allows to keep alignment and ensures guidance of the frame 13 during manipulation or insertion of the removable supporting device within the thermal transfer printing apparatus 200. The position sensor may comprise a laser. A benefit is to improve the precision of the position sensor.

The frame 13 may also comprise other types of sensors, such as temperature sensors. To power the sensors, the frame 13 may be electrically plugged to an external device, such as the thermal transfer printing apparatus 200.

In an embodiment, the frame 13 comprises at least one handle. The handle is for example mounted onto a face of the frame 13 opposite to another face of the frame 13 onto which rollers 12, 14 are mounted. A benefit is to ease the manipulation of the removable supporting device 100 by an operator and to ease cooperation of the removable supporting device 100 with the thermal transfer printing apparatus 200.

In an embodiment, the frame 13 comprises a locking system designed to maintain the frame 13 fastened with the thermal transfer printing apparatus 200. The locking system may comprise an automatic locking system. The locking system may also comprise at least one sensor configured to detect cooperation between the frame 13 and the thermal transfer printing apparatus 200.

Figure 7:
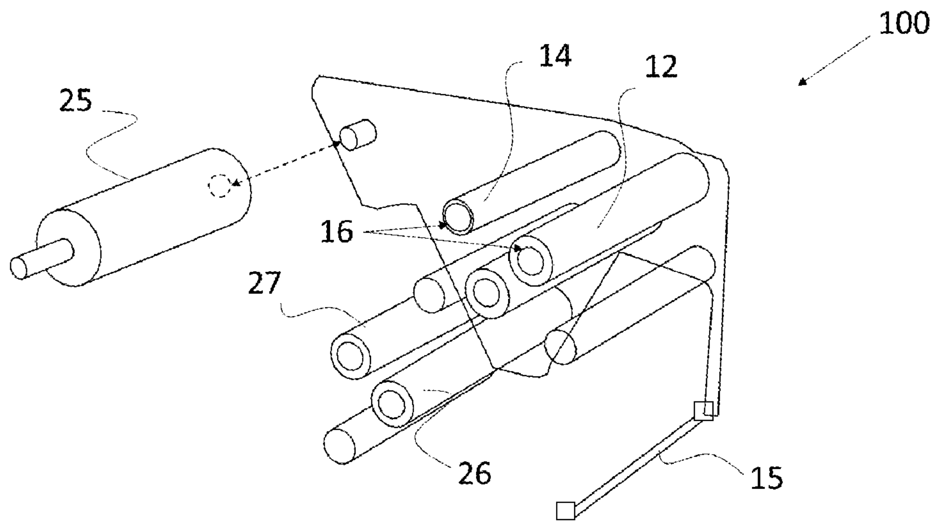
FIG. 7: a schematic representation of a removable supporting device according to the first embodiment, wherein the frame comprises a connecting system adapted to cooperate with a distal end of a roller of a thermal transfer printing apparatus.

In an embodiment, as illustrated on FIG. 7, the frame 13 may comprise a cooperating system to cooperate with a roller 25 of a thermal transfer printing apparatus 200. The cooperating system may allow to remove the roller 25 from the thermal transfer printing apparatus 200, for example when the removable supporting device 100 is removed from the thermal transfer printing apparatus 200. The cooperating system may comprise a male part, such as a protruding cylinder, adapted to cooperate with a female part, such as a hollow part of the roller 25. The female part may be located on a distal end of the roller 25.

Foldable Removable Supporting Device

In an embodiment, the removable supporting device 100 is foldable. The frame 13 may comprise several portions connected by a pivot connection, for example a hinge.

A benefit is to ease the transport and the storage of the removable supporting device.

In an embodiment, the removable supporting device 100 is packaged with an endless ribbon already supported by the supporting system 101.

Supporting System: Rollers

Figure 2:
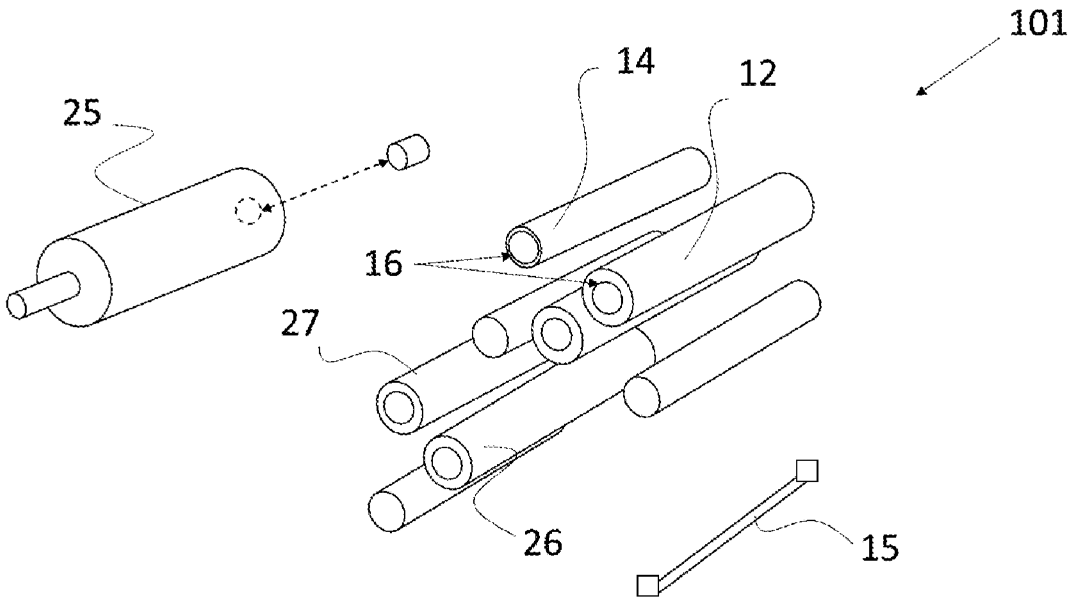
FIG. 2: A schematic representation of the supporting system of a removable supporting device according to the first embodiment.

The removable supporting device 100 further comprises a supporting system 101 to support an endless ribbon 11. FIG. 2 illustrates one possible embodiment of the supporting system 101.

Figure 3:
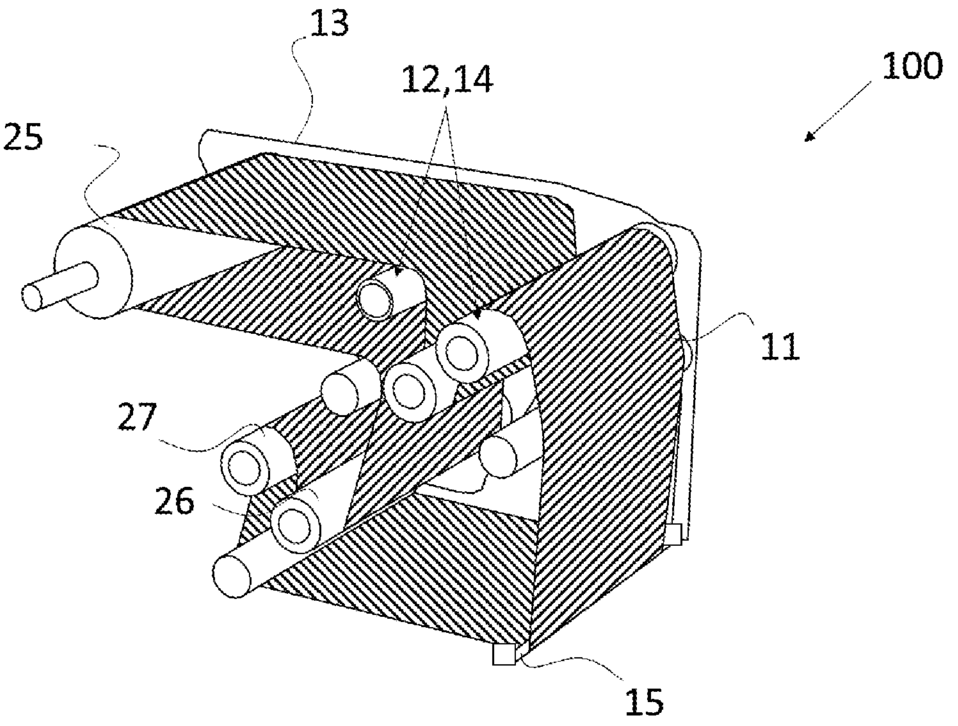
FIG. 3: a schematic representation of the removable supporting device according to the first embodiment, wherein the removable supporting device supports an endless ribbon.

In an embodiment illustrated on FIG. 3, the removable supporting device 100 comprises the endless ribbon 11. The endless ribbon 11 may be an inked ribbon. The endless ribbon 11 may be a coated ribbon.

The supporting system 101 comprises at least two rollers 12, 14 connected to the frame 13.

At least one roller 12, 14 may be connected to the frame with an embedding link.

In an embodiment, the at least one roller 12, 14 has a shape of a cylinder and is mounted onto the frame 13 to rotate around its longitudinal axis.

The rollers 12, 14 may have a cylindrical shape. The rollers 12, 14 are mounted onto the frame 13 with a link allowing at least one degree of freedom around a first axis of rotation $A_1$ which is the longitudinal axis of the cylinder of the roller 12, 14.

In an embodiment, the rollers 12,14 are mechanically connected to the frame 13 in such a way that the longitudinal axis of the rollers 12, 14 is sensibly perpendicular to the surface of the frame 13 in contact with the rollers 12, 14. By sensibly perpendicular, it is meant that there could be an angle deviation, such as less than +/−5 degrees, of the longitudinal axis relative to a strict perpendicular configuration.

In an embodiment, the rollers 12, 14 are mechanically connected to the frame 13 in such a way that the longitudinal axis of the rollers 12, 14 is sensibly perpendicular to the ribbon's width cross section area.

The rollers 12, 14 may also be connected to the frame 13 in such a way that the longitudinal axis of the rollers 12, 14 is sensibly parallel to the longitudinal axis of a roller of the thermal transfer printing apparatus 200. By sensibly parallel, it is meant that there could be a non-zero degree angle, such as less than +/−5 degrees, between the longitudinal axis of the rollers and the longitudinal axis of a roller of the thermal transfer printing apparatus. In one embodiment, at least one roller 12,14 is connected to the frame 13 with a link allowing one degree of freedom in translation. In an embodiment, the roller 12, 14 is free in translation regarding the frame 13 along a plane sensibly perpendicular to the longitudinal axis of the cylinder of the roller 12, 14. By sensibly perpendicular, it is meant that there could be an angle deviation, such as less than +/−5 degrees.

In an embodiment, one roller 12, 14 is a drive roller. The drive roller is connected to a motor to put the drive roller in rotation. At least one battery or power supply may be implemented in the removable supporting device 100 to provide power to the motor. The rotation of the drive roller generates a displacement of the endless ribbon 11 along its path, which also generates a rotation of the other rollers 12, 14.

Each roller 12, 14 may be connected to the frame 13 at a predefined position to allow a specific path of the endless ribbon 11 along said rollers 12, 14. Each roller 12,14 is for example connected to a same face of the frame 13. A benefit to allow installing other elements onto another face of the frame 13, such as handles to ease the displacement of the removable supporting device 100.

In an embodiment, the rollers 12, 14 are connected to the frame 13 in such a way that the tension in the endless ribbon 11 along its path is optimal when the endless ribbon 11 is mounted onto the supporting system 101. In that case, the distance between two consecutive rollers 12, 14 along with their relative position on the frame 13 may be beneficially chosen to allow a specific tension of the endless ribbon 11, when it is positioned along said rollers 12, 14.

In an embodiment, at least one roller 12,14 comprises an arm connected to the frame 13. The connection between the arm and the frame 13 may be ensured by a pivot link. In an embodiment, the arm is mechanically connected to the frame 13 with a pivot link. The arm may comprise a distal end mechanically connected to the frame 13. The arm may comprise a proximal end connected to the roller 12, 14. The distal end may be connected to the frame 13 with one degree of freedom in rotation around a rotation axis sensibly parallel to the first axis of rotation $A_1$ of the roller 12, 14.

In an embodiment, at least one roller 12, 14 is connected to the frame 13 with a link allowing one degree of freedom in rotation.

In an embodiment, at least one roller 12,14 is connected to the frame 13 with a link allowing at least one degree of freedom in translation. The link may allow one degree of freedom in translation along a trajectory defined by the rotation axis of the roller 12,14. A benefit is to allow a displacement of the roller to adjust the tension in an endless ribbon along its path when it is mounted onto the rollers.

Supporting System: Connecting System

The rollers 12,14 comprise first connecting systems 16 adapted to removably cooperate with first complementary connecting systems of a thermal transfer printing apparatus 200.

It should be understood by "removably cooperate" that the first connecting system 16 and the first complementary connecting system are mechanically connectable and disconnectable to each other. In other words, the connecting system 16 and the first complementary connecting system may be fastened and detached. The first connecting system 16 and the first complementary connecting system may be electronically connected or mechanically connected.

The first connecting system 16 and the first complementary connecting system may removably cooperate by a male/female connection. In that case, the first connecting system 16 may comprise a male portion, such as a protruding cylinder, and the first complementary connecting system may comprise a female part, such as a hollow part, adapted to cooperate with the male portion. In another example, the first connecting system 16 comprises the female portion and the first complementary connecting system comprises the male portion. The female portion may be located at a distal end of the rollers 12, 14.

The first connecting system 16 and the complementary connecting system may comprise, but not limited to, cylindrical sliding bars with a conical tip and a counter hollow cylindrical part.

A benefit is to center the removable supporting device 100 before sliding it into the printer.

Another benefit is to ensure that the removable supporting device 100 is well positioned before connecting electrical and electronic components, to ensure that male and female electrical and electric connectors are aligned.

In an embodiment, the first connecting system 16 and the complementary connecting system comprises at least one electrical connector and/or at least one electronic connector.

In an embodiment, at least one electrical connector and/or at least one electronic connector is separated from the first connecting system 16 and from the first complementary connecting system.

In an embodiment, the first connecting system 16 and/or the first complementary connecting system comprise a locking system. The locking system allows to maintain the cooperation between the first connecting system 16 and the first complementary connecting system. The locking system allows to maintain a fixed position of the removable supporting device 100 when it is inserted in the thermal transfer printing apparatus 200. The locking system may comprise a click system, a magnet, an electromagnet, or any other suitable locking system. The locking system may comprise an automatic locking system. The locking system may comprise at least one sensor configured to detect cooperation between the first connecting system 16 and the first complementary connecting system.

In a non-represented embodiment, the removable supporting device 100 comprises guiding elements for engaging the removable supporting device 100 with the thermal transfer printing apparatus 200. The guiding elements comprise for example a sliding element mounted onto a rail, or a longitudinal groove. Beneficially, the guiding elements ease the cooperation between the first connecting system of the removable supporting device 100 and the first complementary connecting system of the thermal transfer printing apparatus 200.

Tensing System: Moving Rollers (Buffer)

In an embodiment, the removable supporting device 100 comprises a tensing system. The tensing system aims at maintaining the endless ribbon 11 under tension along a predefined path, when the endless ribbon 11 is supported by the rollers 12, 14. The tensing system may be connected to the frame 13.

In an embodiment, the tensing system comprises a first moving roller 26. The first moving roller 26 may be movable along a predefined trajectory. By "movable", it should be understood that an axis of rotation of the first moving roller 26 is free in translation or in rotation along a predefined trajectory. The predefined trajectory may be located in a plane sensibly perpendicular to the longitudinal axis of the first moving roller 26. By sensibly perpendicular, it is meant that there could be an angle deviation, such as less than +/−5 degrees. The predefined trajectory may comprise a circular trajectory around a third axis of rotation $A_3$. The third of rotation $A_3$ may be parallel to the first axis of rotation $A_1$ of the rollers 12, 14. The predefined trajectory may also comprise a straight trajectory, for example a vertical straight trajectory or a horizontal straight trajectory along a face of the frame 13 onto which the roller 26, 27 is mounted. The predefined trajectory may also comprise any curved trajectory. The predefined trajectory may also comprise a mix of straight trajectories and curved trajectories.

In an embodiment, the tensing system comprises a second moving roller 27. The second moving roller 27 may be movable along a predefined trajectory. The predefined trajectory may be assigned to a plane sensibly perpendicular to the longitudinal axis of the second moving roller 27. By sensibly perpendicular, it is meant that there could be an angle deviation, such as less than +/−5 degrees. The predefined trajectory may comprise a circular trajectory around the third axis of rotation $A_3$. The predefined trajectory may also comprise a straight trajectory, for example a vertical straight trajectory or a horizontal straight trajectory along a face of the frame 13 onto which the roller 26, 27 is mounted. The predefined trajectory may also comprise any curved trajectory. The predefined trajectory may also comprise a mix of linear trajectories and curved trajectories.

In an embodiment, the removable supporting device 100 comprises a buffer comprising the first moving roller 26 and the second moving roller 27. The movement of the rollers 26, 27 may be synchronized, delayed, postponed or simultaneous to beneficially build the buffer effect and to control the ribbon's tension.

Beneficially, the movement of the first and second moving rollers 26,27 induces a change in the endless ribbon path, which can therefore be shortened or lengthened. In other words, the movement of the first and second moving rollers 26, 27 changes the amount of endless ribbon 11 stored between an entry and an exit of the buffer. Therefore, the movement of the first and second moving rollers 26, 27 regulates the overall tension of the endless ribbon 11.

In an embodiment, the buffer is a pre-printing buffer. It should be understood by "pre-printing buffer" that the buffer is positioned between a coating device and a printhead of a thermal transfer printing apparatus 200 when the removable supporting device 100 is cooperating with the thermal transfer printing apparatus 200, and that the endless ribbon 11 path goes from the coating device to the printhead through the pre-printing buffer. In other words, the entry of the pre-printing buffer is a zone wherein the endless ribbon 11 is coated and the exit of the pre-printing buffer is upstream a printing zone. By "cooperating with a thermal transfer printing apparatus", it should be understood any mechanical or electrical cooperation between the removable supporting device 100 and a thermal transfer printing apparatus, such as a cooperation of first connecting system of the removable supporting device with first complementary connecting system of the thermal transfer printing apparatus.

In an example, when the amount of ribbon stored between an entry and an exit of the pre-printing buffer is increased or reduced, the overall tension in the inked ribbon could be respectively increased or reduced. It should be understood by "inked ribbon" a portion of the endless ribbon 11 stored between the entry and the exit of the pre-printing buffer that has been coated by a coating module of the thermal transfer printing apparatus before entering the pre-printing buffer.

In an embodiment, the buffer is a post-printing buffer. It should be understood by "post-printing buffer" that the buffer is positioned between a printhead and a coating device of a thermal transfer printing apparatus 200 when the removable supporting device 100 is cooperating with a thermal transfer printing apparatus 200, and that the endless ribbon 11 goes from the printhead to the coating device through the post-printing buffer.

In an example, when the amount of ribbon stored between the entry and the exit of the post-printing buffer is increased or reduced, the overall tension in the printed ribbon could be respectively increased or reduced. It should be understood by "printed ribbon" a portion of the endless ribbon 11 that has been used to print by system of the printhead before entering the post-printing buffer.

Figure 8:
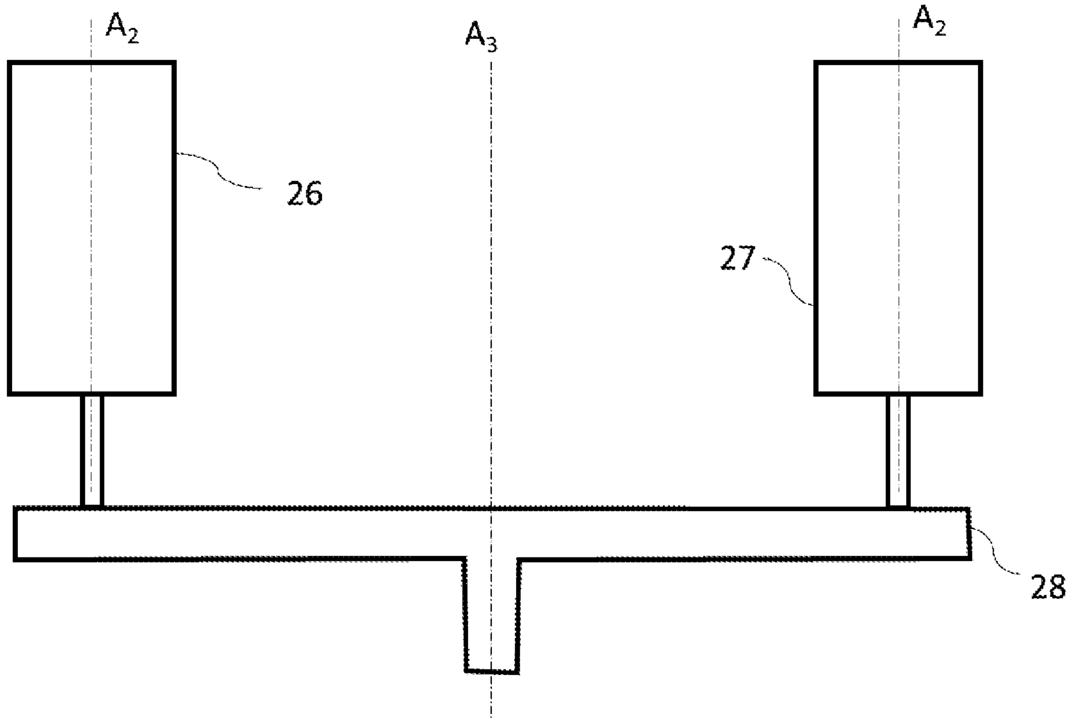
FIG. 8: a schematic representation of a support of a removable supporting device according to the first embodiment, wherein the two moving rollers are mounted onto the support and are movable around an axis of rotation.

As illustrated on FIG. 8, the first moving roller 26 and the second moving roller 27 may be mounted onto a support 28. The support 28 may be connected to the frame 13. The support 28 may be movable in rotation around the third axis of rotation $A_3$. This configuration beneficially allows to put the first and second moving rollers 26, 27 in motion along their predefined trajectory, for example when the predefined trajectory comprises a revolution around the third axis of rotation $A_3$.

Figure 9:
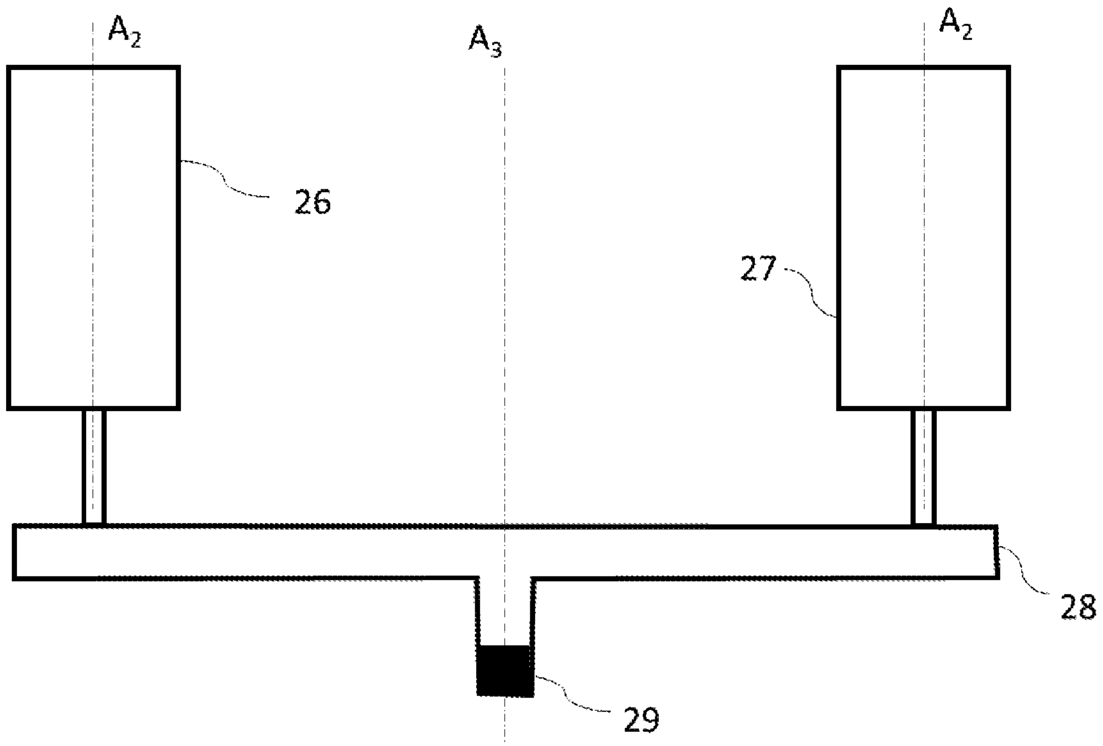
FIG. 9: a schematic representation of a support of a removable supporting device according to the first embodiment, wherein the two moving rollers are mounted onto the support and are movable around an axis of rotation and wherein the support comprises a spring element allowing its rotation around an axis of rotation.

For that purpose, as illustrated on FIG. 9, the buffer may comprise a spring element 29 to allow the rotation of the support 28. In this configuration, the first moving roller 26 and the second moving roller 27 of the buffer may be movable along a circular trajectory around a same axis. A benefit is to control the tension in the endless ribbon 11 with one unique motor controlling the rotation of the support 28.

The support 28 may comprise a pivot around which the support 28 is allowed to rotate.

In an embodiment, the buffer comprises a rail to guide the first moving roller 26 and/or the second moving roller 27 along a predefined trajectory.

In an embodiment, the first moving roller 26 and the second moving roller 27 are arranged in such a way that each roller is supporting an opposite face of the endless ribbon 11. The relative movement of the two moving rollers 26, 27 may cause an increase or a decrease in the tension in the ribbon. Furthermore, the movement of the two moving rollers 26, 27 along a same direction of a circular trajectory around the same rotation axis makes the buffer compact regarding the difference of the amount or length of ribbon stored within said buffer zone.

In an embodiment, the tensing system comprise a plurality of buffers, each buffer comprising at least two moving rollers. For example, the tensing system may comprise a preprinting buffer and a post printing buffer.

In an embodiment, the removable supporting device 100 comprises a motor to drive the first and second moving rollers 26, 27 along their predefined trajectory.

In an embodiment, the removable supporting device 100 is adapted to cooperate electrically with a thermal transfer printing apparatus to drive the first and second moving rollers 26, 27. In that case, the thermal transfer printing apparatus comprises a motor adapted to switch on the first and second moving rollers 26, 27.

The removable supporting device 100 may comprise active components. The active components may be powered through at least one electrical connector suitable to be connected to a power system, for example a power system from the thermal transfer printing apparatus 200. The active components may also be connected to a control system, for example a control system in the thermal transfer printing apparatus 200.

Thus, when the removable supporting device 100 is inserted in the thermal transfer printing apparatus 200, it may function as an integral part of the thermal transfer printing apparatus 200.

In an embodiment, the removable device 100 comprise at least one active component and/or at least one sensor and/or at least one electrical connector suitable to be connected to a thermal transfer printing apparatus 200 in such a way that the sensors and/or the active components remain connected to the thermal transfer printing apparatus 200 when the first connecting system 16 is not cooperating with the first complementary connecting system.

A benefit is to enable to change the endless ribbon 11 on the removable supporting device through a controller of the thermal transfer printing apparatus.

In an embodiment, the removable supporting device 100 is adapted to cooperate with a separate device, such as a robot, the separate device enabling to change the endless ribbon 11.

A benefit is to replace the ribbon in an active and rapid way.

Tensing System: Supporting System

In an embodiment, the tensing system comprises a supporting system 17. The supporting system 17 may be connected to the frame 13. The supporting system 17 may extend in a direction sensibly parallel to the longitudinal axis of the rollers 12, 14. The supporting system 17 may have a length sensibly equal to the length of the rollers 12,14. By sensibly parallel, it is meant that there could be a non-zero degree angle, such as less than +/−5 degrees, The supporting system 17 may also have a length adapted to allow cooperation of the supporting system 17 with any roller of a thermal transfer printing apparatus 200.

The supporting system 17 may comprise an outer convex portion to support the endless ribbon 11. The outer convex portion beneficially allows to reduce the local strain in the endless ribbon 11 when the supporting system 17 supports the endless ribbon 11.

The supporting system 17 may be connected to the frame 13 with a mobile link. The mobile link allows one degree of freedom. In an embodiment, the degree of freedom is a degree of freedom in rotation around a fourth axis of rotation $A_4$ sensibly parallel to the first axis of rotation $A_1$ of the rollers 12, 14. By sensibly parallel, it is meant that there could be a non-zero degree angle, such as less than +/−5 degrees, In an embodiment, the supporting system 17 is arranged on the frame 13 in such a way that, when the removable supporting device 100 is cooperating with the thermal transfer printing apparatus 200, the fourth axis of rotation $A_4$ of the supporting system 17 merges with an axis of rotation of a roller of the thermal transfer printing apparatus 200.

In an embodiment, the supporting system 17 is movable from a first position to a second position, for example according to one degree of freedom allowed by the mobile link. The supporting system 17 may be movable from the first position to the second position by a rotation around the fourth axis of rotation $A_4$. The first position of the supporting system 17 allows maintaining the endless ribbon 11 on its outer convex portion with a first predefined tension. The second position allows reducing the tension in the endless ribbon 11. The transition from the first to the second position allows to display properly the endless ribbon 11 from the supporting system 17 to a roller of the thermal transfer printing apparatus 200.

The first position beneficially allows to unfold the endless ribbon 11 in such a way that the endless ribbon 11 is not in contact with the roller of the thermal transfer printing apparatus 200 at the position of the supporting system 17.

The second position allows beneficially to display the endless ribbon 11 at the position of the supporting system 17 until the endless ribbon is fully unfolded over the supporting system to be inserted within the thermal transfer printing apparatus 200.

In another embodiment, the supporting system 17 may be in their second position when the removable supporting device 100 is cooperating with the thermal transfer printing apparatus 200. In this configuration, the supporting system 17 does not support the endless ribbon 11. For example, the transition between the first position and the second position of the supporting system 17 allows to unfold the endless ribbon onto a roller of the thermal transfer printing apparatus 200. In this configuration, the thermal transfer printing apparatus 200 may be able to fully function while the removable supporting device 100 is inserted in the thermal transfer printing apparatus 200. By "fully function", it should be understood that printing is possible.

Figure 4:
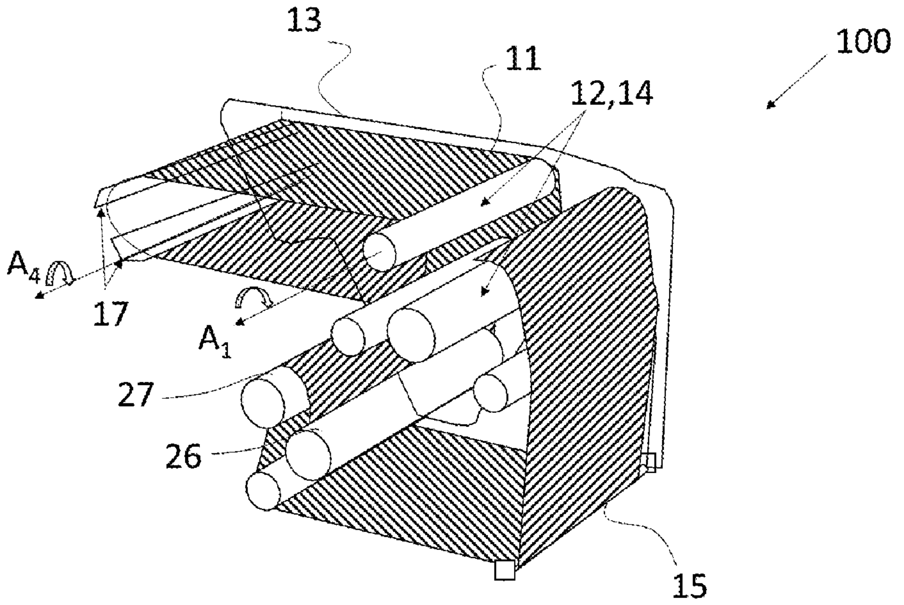
FIG. 4: a schematic representation of the removable supporting device according to the first embodiment, wherein the removable supporting device comprises a rotatable supporting system.
Figure 6:
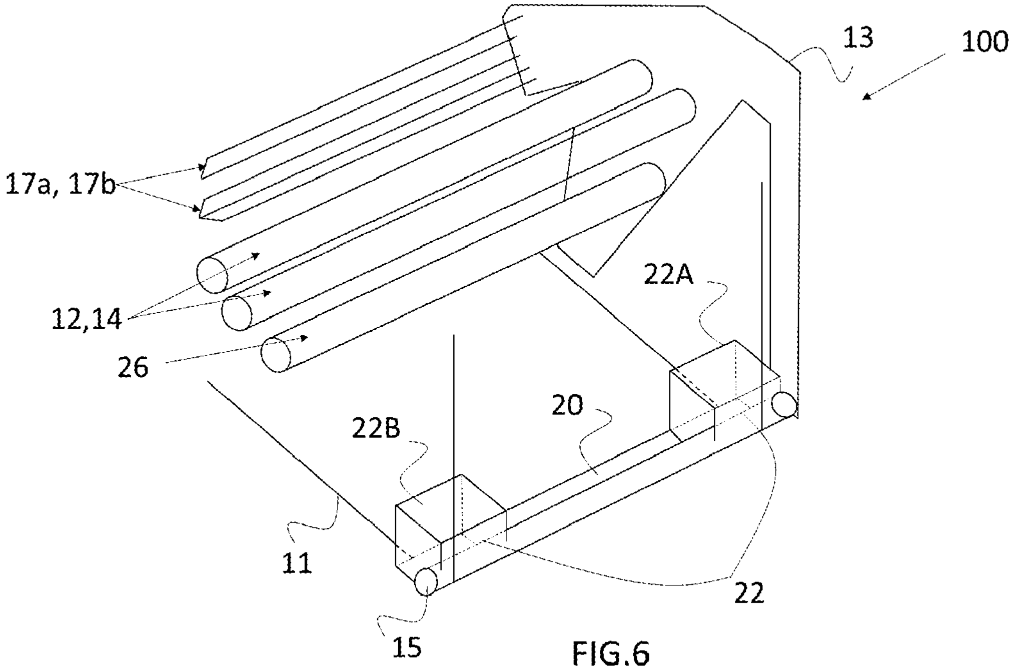
FIG. 6: a schematic representation of a removable supporting device according to the first embodiment, wherein the removable supporting device comprises a longitudinal bearing to support a tensing roller.

The supporting system 17 may comprise several longitudinal elements. FIG. 4 and FIG. 6 illustrate an example wherein the supporting system 17 comprises two longitudinal elements 17*a*, 17*b*.

The supporting system 17 may be movable along a predefined trajectory.

The predefined trajectory may comprise a linear trajectory in translation, for example a vertical straight trajectory or a horizontal straight trajectory. The predefined trajectory may also comprise any curved trajectory. For that purpose, the supporting system 17 may be connected to the frame 13 by a distal end, the connection between the distal end of the supporting system 17 and the frame 13 allowing at least one degree of freedom in translation. The supporting system 17 may for example be mounted onto a rail, allowing their translation along the frame 13 along a predefined trajectory.

The removable supporting device 100 may comprise a motor to drive the movement of the supporting system 17 along its predefined trajectory or between the first and the second position.

In another embodiment, the removable supporting device 100 is adapted to cooperate electrically with a thermasysteml transfer printing apparatus 200 to allow driving the supporting system 17. In that case, the thermal transfer printing apparatus 200 comprises the motor.

The supporting system 17 may also comprise at least one longitudinal portion having a curved portion.

In an embodiment, the cross section of the supporting system 17 may be sensibly a V shape. The cross section of the supporting system 17 may comprise arms with an angle of strictly less than 180° in such a way that the ribbon is in contact with an obtuse angle. An example of this embodiment is represented on FIG. 6.

The cross section of the supporting system 17 may also be a sensibly U shape.

A benefit of the curved portion is to use supporting system 17 that is specifically shaped to ease their cooperation with specific roller 25 of the thermal transfer printing apparatus 200. As such, the cooperation between the supporting system 17 and the roller 25 is eased, and so is the insertion of the endless ribbon 11.

Delamination Roller and Longitudinal Bearings

In an embodiment, the supporting system 101 comprises a delamination roller 15. It should be understood by "delamination roller" a roller that aims at separating the endless ribbon 11 from a substrate after the printing operation.

The delamination roller 15 may be connected to the frame 13 by one proximal end. The delamination roller 15 may extend in a direction parallel to the axis of the rollers 12, 14.

The delamination roller 15 may be positioned on the frame 13 so that the distance between the delamination roller 15 and the other rollers 12, 14 is maximum. For example, the delamination roller 15 may be positioned on a low portion of the frame 13, for example proximate to a corner as represented on FIG. 1.

The delamination roller 15 may have a lower diameter than the diameter of the rollers 12, 14.

A benefit of the low diameter of the delamination roller 15 is to allow a sharp delamination angle.

The delamination roller 15 is for example placed on the frame 13 at a specific position so that, when the removable supporting device 100 is cooperating with the thermal transfer printing apparatus 200, the delamination of the endless ribbon 11 is done after the printing operation.

The delamination roller 15 is for example placed on the frame 13 so that the endless ribbon 11 goes through the printhead to the delamination roller 15 when the removable supporting device 100 is inserted in the thermal transfer printing apparatus 200.

A benefit to use a rotating delamination roller 15 instead of a static piece is to avoid friction that would result in premature wear of the endless ribbon 11.

The delamination roller 15 may comprise an electrically conductive material. The material is for example a metal.

A benefit is to discharge electrostatic charges from the endless ribbon 11 after its passage underneath the printhead.

In an embodiment, the supporting system 101 comprises a longitudinal bearing 20. The longitudinal bearing 20 aims at supporting the delamination roller 15 to avoid deformation of the delamination roller 15, for example when the delamination roller 15 has a lower diameter than the rollers 12, 14, and therefore needs to be reinforced to support the endless ribbon 11.

The longitudinal bearing beneficially allows to avoid deformation of the delamination roller 15 resulting from the endless ribbon's tension. The longitudinal bearing also beneficially allows to reduce the weakening of the bending stiffness of the delamination roller 15 when the ribbon is running overs rollers of the supporting system.

The longitudinal bearing 20 may have a proximal end connected to the frame 13. The longitudinal bearing 20 may extend in a direction parallel to the axis of the tensing roller 15.

The longitudinal bearing 20 may be mechanically connected to the frame 13 and/or to the delamination roller 15. A benefit is to reinforce the delamination roller 15.

The longitudinal bearing 20 may extend behind the delamination roller 15 while in contact with the delamination roller 15. The bearing 20 holds the delamination roller 15 with no contact with the endless ribbon 11. A benefit is to support the delamination roller 15 to ensure it does not sag, blend, warp or break under the force applied by the endless ribbon 11 when the delamination roller 15 is supporting the endless ribbon 11. The longitudinal bearing 20 may be larger than the delamination roller 15.

In reference to FIGS. 6 and 7, the longitudinal bearing 20 may comprise a first cooperation block arranged at a proximal end of the delamination roller 15 and a second cooperation block arranged at a distal end of the delamination roller 15.

The cooperation blocks may have a sensibly cubicle shape. The cooperation blocks 22 may be designed to cooperate with the delamination roller 15. For example, the first cooperation block may cooperate with a proximal end of the delamination roller 15 proximate to the frame 13. The second cooperation block may cooperate with a distal end delamination roller 15. The first cooperation block may be mechanically connected to the frame 13. A benefit is to reinforce the supporting of the delamination roller 15.

Controller

In an embodiment, the removable supporting device 100 comprises a controller. The controller may control any mechatronic element of the removable supporting device 100 and/or of the thermal transfer printing apparatus 200.

The controller may control the rollers 12, 14 and the tensing system. For example, the controller may control a displacement of the rollers 12, 14 along their predefined trajectory. The controller may also control a displacement of the supporting system 17 along its predefined trajectory. The controller may also control a displacement of the first and second moving rollers 26, 27 along their predefined trajectory.

In an embodiment, the controller controls at least one motor to drive the displacement of the rollers 12, 14 and/or the displacement of the tensing system, for example the first and second moving rollers 26, 27 and/or the supporting system 17.

In an embodiment, the removable supporting device 100 comprises at least one electrical connector to be connected and/or disconnected with a controller of the thermal transfer printing apparatus 200. In the case, the removable supporting device 100 comprises one or several motors to drive the rollers 12, 14 or the tensing system, the electrical connection allows the controller to drive the motors.

In an embodiment, the removable supporting device 100 comprises at least one electrical connector to connect with at least one motor of the thermal transfer printing apparatus 200.

In that case, the motors may be controlled by a controller of the thermal transfer printing apparatus 200 and the motors may be electrically connected to the rollers 12, 14 or the tensing system in order to drive it.

In an embodiment, the controller is configured to drive the first moving roller 26 and the second moving roller 27 along their predefined trajectory.

In an embodiment, the support 28 is connected to a motor. In that case, the support may be driven, for example along a circular trajectory along the third axis of rotation $A_3$.

The controller may control at least one sensor of the removable supporting device 100 and/or of the thermal transfer printing apparatus 200. The controller may also emit at least one command in response to at least one signal received from a sensor.

The controller may control the tension in the endless ribbon 11. The controller may for example emit a command to drive one or several rollers to adjust the tension in the endless ribbon 11. The controller may also send an alert or emit a command to stop the printing. For example, the sensor may command to stop the printer when the tension detected in the endless ribbon 11 is different from a target value, exhibits wrinkles or if the endless ribbon 11 is detected as wrongly positioned.

The controller may receive signals from the sensors detecting the presence of the endless ribbon 11, its compliance with the printer (i.e., its dimension, tension, robustness . . . ), and/or its working state. For example, the sensors may be configured to detect wear and tear, deterioration, and/or flaws of the endless ribbon 11. In each case, the controller may send an alert to indicate that the endless ribbon 11 must be installed, replaced or adjusted. In each case, the controller may also stop the system. In each case, the controller may be able to recover a pre-defined set of parameters to arrange the supporting system accordingly and ease the insertion of the removable device within the printer. The controller may therefore comprise a memory, recognize the placement of rollers and allow the supporting system to recover a specific set-up, display or configuration.

A benefit is to rapidly set-up the removable device ready for printing once it is inserted in the printer. A benefit is to prevent printing issues. Another benefit is to prevent damaging the system. Another benefit is to anticipate preventive and/or curative maintenance.

Thermal Transfer Printing Apparatus

Figure 5:
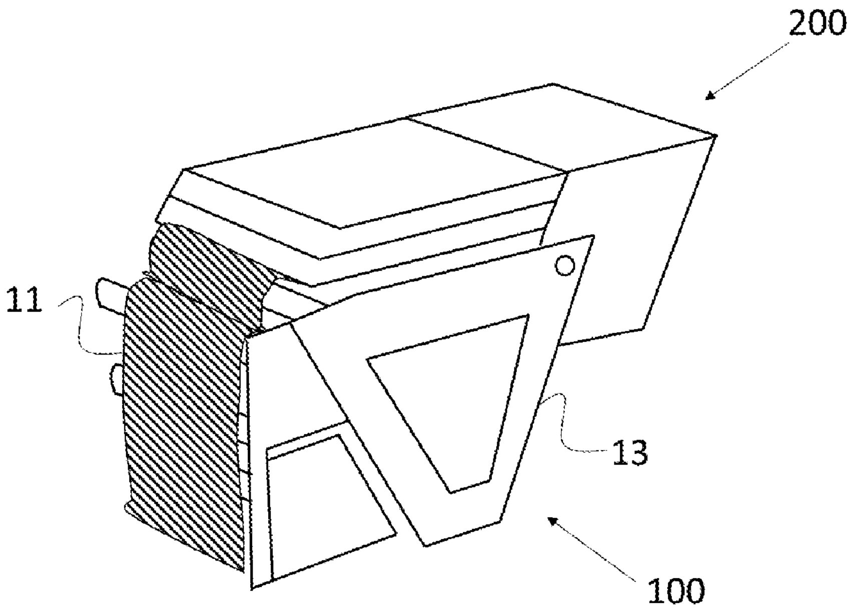
FIG. 5: a schematic representation of a thermal transfer printing apparatus according to a second embodiment of the invention, wherein the thermal transfer printing apparatus comprises a removable supporting device according to the first embodiment.

An aspect of the invention further relates to a thermal transfer printing apparatus 200 comprising a removable supporting device according to the first aspect of the invention. An exemplary embodiment of the thermal transfer printing apparatus 200 is illustrated on FIG. 5.

The thermal transfer printing apparatus 200 may comprise the first complementary connecting system to cooperate with the first connecting system of the removable supporting device 100.

The thermal transfer printing apparatus 200 may comprise at least one motor to drive at least one element of the supporting system 101, such as the rollers 12, 14, the tensing system or the tensing roller 15.

The thermal transfer printing apparatus 200 may comprise a controller to control the motor.

The thermal transfer printing apparatus 200 may further comprise a printhead. The printhead beneficially allows to transfer ink from the endless ribbon 11 to a substrate, using thermal transfer printing.

The thermal transfer printing apparatus 200 may further comprise a coater to continuously coat a face of the endless ribbon 11 with new ink. The coater may comprise a slot-die coating device, an ink roller or any coating device known by the skilled person to coat a ribbon.

Method/Initialization

According to another aspect, the invention relates to a method for replacing an endless ribbon in a thermal transfer printing apparatus 200 using a removable supporting device 100 according to the first aspect of the invention.

The method may comprise a step of inserting the removable supporting device 100 in the thermal transfer printing apparatus 200 in such a way that the first connecting system 16 cooperates mechanically and/or electronically with the first complementary connecting system of the thermal transfer printing apparatus 200.

The method may comprise a step of removing a second removable supporting device from the thermal transfer printing apparatus before inserting the removable supporting device 100. The second removable supporting device may comprise a used endless ribbon that needs to be replaced.

The method may comprise a step of connecting electronical elements and/or electrical elements. This step may for example be implemented when the electrical and/or electronic connectors are separated from the first connecting system 16 and/or from the first complementary connecting system.

The method may comprise a step of controlling alignment of the first connecting system 16 with the first complementary connecting system. This step may be implemented with the use of a controller receiving signals from at least one sensor.

The method may comprise a step of controlling the position and the tension in the endless ribbon 11. This step may be implemented with the use of a controller receiving signals from at least one sensor.

The method may comprise a step of repositioning and/or adjusting the tension in the endless ribbon 11. This step may be implemented when at least one sensor has detected a mispositioning or a wrong tension in the endless ribbon 11. It should be understood by "wrong tension" a tension in the endless ribbon inadequate for printing, or a tension in the endless ribbon 11 that would risk damaging the system or the endless ribbon 11 itself. The tension in the endless ribbon 11 may be adjusted by driving rollers and/or buffer rollers of the thermal transfer printing apparatus 200 and/or rollers of the removable supporting device 100. The controller may for example send a command to start a motor to drive at least one roller until a target position or a target tension value is reached.

The controller may execute the steps according to a predefined sequence when the removable supporting device 100 is inserted in the thermal transfer printing apparatus 200. A benefit is to control several parameters before enabling the printing process. Another benefit is to ensure high quality printing.

It will be appreciated that the various embodiments and aspects of the inventions described previously are combinable according to any technically permissible combinations.

The articles "a" and "an" may be employed in connection with various elements and components, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The invention claimed is:

1. A removable supporting device comprising:

a frame;

an endless ribbon, and a supporting system to support the endless ribbon, the supporting system comprising:

at least two rollers connected to the frame; said at least two rollers comprising a first connecting system adapted to cooperate with a first complementary connecting system of a thermal transfer printing apparatus, a delamination roller having a lower diameter than the at least two rollers, a tensing system connected to the frame to keep the endless ribbon under tension, the tensing system comprising a supporting system having an outer convex portion to support the endless ribbon, said supporting system comprising two longitudinal elements connected to the frame with a link allowing at least one degree of freedom in rotation around a fourth axis of rotation parallel to a longitudinal axis of the at least two rollers.

2. The removable supporting device according to claim 1, wherein the delamination roller comprises a longitudinal bearing extending from the frame and parallelly to the delamination roller, said longitudinal bearing mechanically strengthening the delamination roller.

3. The removable supporting device according to claim 2, wherein the longitudinal bearing comprises a first cooperation block cooperating with a first end of the delamination roller proximate to the frame and a second cooperation block cooperating with a second end of the delamination roller opposite to the first end of the delamination roller.

4. The removable supporting device according to claim 1, wherein the delamination roller comprises an electrically conductive material and wherein the delamination roller comprises a portion in contact with the endless ribbon to allow electrostatic discharge of said endless ribbon.

5. The removable supporting device according to claim 1, wherein the tensing system comprises a buffer comprising a first moving roller and a second moving roller, the second moving roller being movable along a predefined trajectory in a plane sensibly perpendicular to the longitudinal axis of said second moving roller.

6. The removable supporting device according to claim 1, wherein the supporting system is movable between a first position and a second position, said first position allowing to maintain the endless ribbon on the outer convex portion with a local first predefined tension and said second position allowing reducing the local tension in the endless ribbon.

7. The removable supporting device according to claim 1, wherein the frame comprises a second connecting system adapted to cooperate with a distal end of a roller of the thermal transfer printing apparatus.

8. The removable supporting device according to claim 1, wherein the first connecting system comprises an element of a male/female connecting system and wherein the first complementary connecting system of the thermal transfer printing apparatus comprises a complementary element of the male/female connecting system.

9. A thermal transfer printing apparatus comprising:

a coating module to coat the endless ribbon with a coating composition;

a printhead to print by thermal transfer a portion of the coating composition on a printing zone;

a removable supporting device according to claim 1 wherein the supporting system is adapted to transport the endless ribbon from the coating module to the printhead and from the printhead to the coating module;

the first complementary connecting system adapted to cooperate with the first connecting system of the supporting system, and a motor to drive at least one roller of the thermal transfer printing apparatus.

10. The thermal transfer printing apparatus according to claim 9, wherein the delamination roller of the removable supporting device comprises an electrically conductive material and is arranged in such a way that at least a portion of the delamination roller is in contact with the endless ribbon at a position located between the printhead and the coating module.

11. A method to replace an endless ribbon in a thermal transfer printing apparatus using a removable supporting device according to claim 1, the method comprising:

inserting the removable supporting device in the thermal transfer printing apparatus in such a way that the first connecting system cooperates with the first complementary connecting system.

12. The method to replace an endless ribbon in a thermal transfer printing apparatus according to claim 11, wherein the method comprises:

removing a second removable supporting device from the thermal printing apparatus.

13. The method to replace an endless ribbon in a thermal transfer printing apparatus according to claim 11, the method comprising:

controlling alignment of the first connecting system and of the first complementary connecting system by a controller;

controlling a position of the endless ribbon in the thermal transfer printing apparatus by at least one position sensor, and driving at least one roller of the thermal transfer printing apparatus and/or of the removable supporting device when the position detected does not correspond to a target position.

14. A removable supporting device comprising:

a frame;

an endless ribbon, and a supporting system to support the endless ribbon, the supporting system comprising:

at least two rollers connected to the frame; said at least two rollers comprising a first connecting system adapted to cooperate with a first complementary connecting system of a thermal transfer printing apparatus, a delamination roller having a lower diameter than the at least two rollers, a tensing system connected to the frame to keep the endless ribbon under tension, the tensing system comprising a buffer comprising a first moving roller and a second moving roller, the second moving roller being movable along a predefined trajectory in a plane sensibly perpendicular to the longitudinal axis of said second moving roller, wherein both the first moving roller and the second moving roller of the buffer are movable along a circular trajectory around a same second axis of rotation sensibly parallel to a first axis of rotation of the at least two rollers.

15. A removable supporting device comprising:

a frame;

an endless ribbon, and a supporting system to support the endless ribbon, the supporting system comprising:

at least two rollers connected to the frame; said at least two rollers comprising a first connecting system adapted to cooperate with a first complementary connecting system of a thermal transfer printing apparatus, a delamination roller having a lower diameter than the at least two rollers, a tensing system connected to the frame to keep the endless ribbon under tension, the tensing system comprising a buffer comprising a first moving roller and a second moving roller, the second moving roller being movable along a predefined trajectory in a plane sensibly perpendicular to the longitudinal axis of said second moving roller, wherein both the first moving roller and the second moving roller of the buffer are mounted onto a support, said support being movable in rotation around a third axis of rotation sensibly parallel to the second axis of rotation.

16. A removable supporting device comprising:

a frame;

an endless ribbon, and a supporting system to support the endless ribbon, the supporting system comprising:

at least two rollers connected to the frame; said at least two rollers comprising a first connecting system adapted to cooperate with a first complementary connecting system of a thermal transfer printing apparatus, and a delamination roller having a lower diameter than the at least two rollers, wherein at least one roller of the at least two rollers comprises an arm having a first distal end connected to said roller and a second distal end mechanically connected to the frame by a pivot connection allowing the rotation of said roller along a predefined trajectory around the first longitudinal axis.

17. The removable supporting device according to claim 16, wherein the supporting system comprises a tensing system connected to the frame to keep the endless ribbon under tension.

18. The removable supporting device according to claim 17, wherein the tensing system comprises a supporting system having an outer convex portion to support the endless ribbon, said supporting system comprising two longitudinal elements connected to the frame with a link allowing at least one degree of freedom in rotation around a fourth axis of rotation parallel to a longitudinal axis of the at least two rollers.

* * * * *